US012453591B2

(12) United States Patent
Tanaka et al.

(10) Patent No.: US 12,453,591 B2
(45) Date of Patent: Oct. 28, 2025

(54) HEATING BLADE UNIT, TREATMENT TOOL, AND METHOD OF MANUFACTURING HEATING BLADE UNIT

(71) Applicant: OLYMPUS CORPORATION, Hachioji (JP)

(72) Inventors: Kazuhiro Tanaka, Hachioji (JP); Hiroki Kazuno, Koganei (JP)

(73) Assignee: OLYMPUS CORPORATION, Tokyo (JP)

( * ) Notice: Subject to any disclaimer, the term of this patent is extended or adjusted under 35 U.S.C. 154(b) by 474 days.

(21) Appl. No.: 17/849,111

(22) Filed: Jun. 24, 2022

(65) Prior Publication Data

US 2022/0323135 A1 Oct. 13, 2022

Related U.S. Application Data

(63) Continuation of application No. PCT/JP2020/017267, filed on Apr. 21, 2020.

(51) Int. Cl.
*A61B 18/08* (2006.01)
*A61B 18/10* (2006.01)
*B29C 65/00* (2006.01)
*B29C 65/48* (2006.01)
*A61B 17/00* (2006.01)
(Continued)

(52) U.S. Cl.
CPC ............ *A61B 18/085* (2013.01); *A61B 18/10* (2013.01); *B29C 65/48* (2013.01); *B29C 66/02* (2013.01); *B29C 66/03* (2013.01); *A61B 2017/00526* (2013.01); *A61B 2017/00858* (2013.01); *A61B 2018/00083* (2013.01); 
(Continued)

(58) Field of Classification Search
CPC .............................. A61B 18/085; A61B 18/10
See application file for complete search history.

(56) References Cited

U.S. PATENT DOCUMENTS 4,656,334 A * 4/1987 Endo .................... A47C 21/048
219/505
6,012,457 A * 1/2000 Lesh .................. A61M 25/1002
601/2
(Continued)

FOREIGN PATENT DOCUMENTS

DE 102015220917 A1 * 4/2017
JP 2004-329764 A 11/2004
(Continued)

OTHER PUBLICATIONS

DE-102015220917-A1 machine translation (Year: 2017).*
Jun. 23, 2020 International Search Report issued in International Patent Application No. PCT/JP2020/017267.

*Primary Examiner* — Erin McGrath
(74) *Attorney, Agent, or Firm* — Oliff PLC

(57) ABSTRACT

A heating blade unit, a treatment tool, and a method of manufacturing a heating blade unit are disclosed. The heating blade unit includes: an electric heater, a blade, and a cover made of a thermosetting resin. The blade includes a treatment surface, an installation surface that is provided on a side opposite to the treatment surface and on which the electric heater is installed, and a support surface that is provided at a position different from a position at which the installation surface is provided. The cover integrally covers the electric heater, and one or more surfaces of the blade.

19 Claims, 14 Drawing Sheets

(51) Int. Cl.
  *A61B 18/00* (2006.01)
  *B29K 701/10* (2006.01)
  *B29L 31/00* (2006.01)

(52) U.S. Cl.
  CPC ... *A61B 2018/0013* (2013.01); *B29K 2701/10* (2013.01); *B29L 2031/779* (2013.01)

(56) References Cited

U.S. PATENT DOCUMENTS

| | | | | |
|---|---|---|---|---|
| 6,078,123 | A * | 6/2000 | Tanaka | G01N 29/2462 |
| | | | | 310/342 |
| 7,025,763 | B2 * | 4/2006 | Karasawa | A61B 18/085 |
| | | | | 606/29 |
| 2005/0288747 | A1 * | 12/2005 | Aoki | A61B 18/085 |
| | | | | 607/96 |
| 2012/0323232 | A1 * | 12/2012 | Wolf | A61B 18/12 |
| | | | | 606/1 |
| 2013/0197516 | A1 * | 8/2013 | Kappel | A61B 17/29 |
| | | | | 606/46 |
| 2015/0257205 | A1 * | 9/2015 | Hase | H05B 3/16 |
| | | | | 219/539 |
| 2015/0373781 | A1 * | 12/2015 | Augustine | H05B 3/347 |
| | | | | 219/217 |
| 2017/0014175 | A1 * | 1/2017 | Takashino | A61B 18/1445 |
| 2017/0245923 | A1 * | 8/2017 | Takashino | A61B 18/085 |
| 2019/0357970 | A1 * | 11/2019 | Akagane | H05B 3/36 |
| 2020/0275969 | A1 | 9/2020 | Takei et al. | |

FOREIGN PATENT DOCUMENTS

| | | |
|---|---|---|
| JP | 2013-138792 A | 7/2013 |
| WO | 2019/102552 A1 | 5/2019 |
| WO | 2019/150496 A1 | 8/2019 |

* cited by examiner

HEATING BLADE UNIT, TREATMENT TOOL, AND METHOD OF MANUFACTURING HEATING BLADE UNIT

CROSS-REFERENCE TO RELATED APPLICATION

This application is a continuation of International Application No. PCT/JP2020/017267, filed on Apr. 21, 2020, the entire contents of which are incorporated herein by reference.

BACKGROUND

1. Technical Field

The present disclosure relates to a heating blade unit, a treatment tool, and a method of manufacturing a heating blade unit.

2. Related Art

In the related, a medical device that grips a biological tissue with a pair of grippers and heats a heater provided on at least one of the grippers to perform cauterization, coagulation, incision, and the like on the gripped biological tissue is known. In the medical device, heat transfer from the blade is blocked by including a holding unit in which the blade that performs heat treatment is integrally molded with a resin having a low thermal conductivity.

SUMMARY

In some embodiments, a heating blade unit includes: an electric heater, a blade, and a cover made of a thermosetting resin. The blade includes a treatment surface, an installation surface that is provided on a side opposite to the treatment surface and on which the electric heater is installed, and a support surface that is provided at a position different from a position at which the installation surface is provided. The cover integrally covers the electric heater, and one or more of the surfaces of the blade, such as one or more of the installation surface, the support surface, and a stepped surface between the installation surface and the support surface.

In some embodiments, a treatment tool includes: the heating blade unit, a power source configured to supply power to the electric heater, and a housing that holds the power source.

In some embodiments, a method of manufacturing the heating blade unit includes: performing a surface roughening treatment on the blade, adhering the electric heater to the installation surface by an adhesive layer; covering the electric heater, and one or more surfaces of the blade with a cover made of a thermosetting resin; and performing a surface treatment for preventing sticking of the biological tissue on the treatment surface.

The above and other features, advantages and technical and industrial significance of this disclosure will be better understood by reading the following detailed description of presently preferred embodiments of the disclosure, when considered in connection with the accompanying drawings.

DETAILED DESCRIPTION

Figure 1:
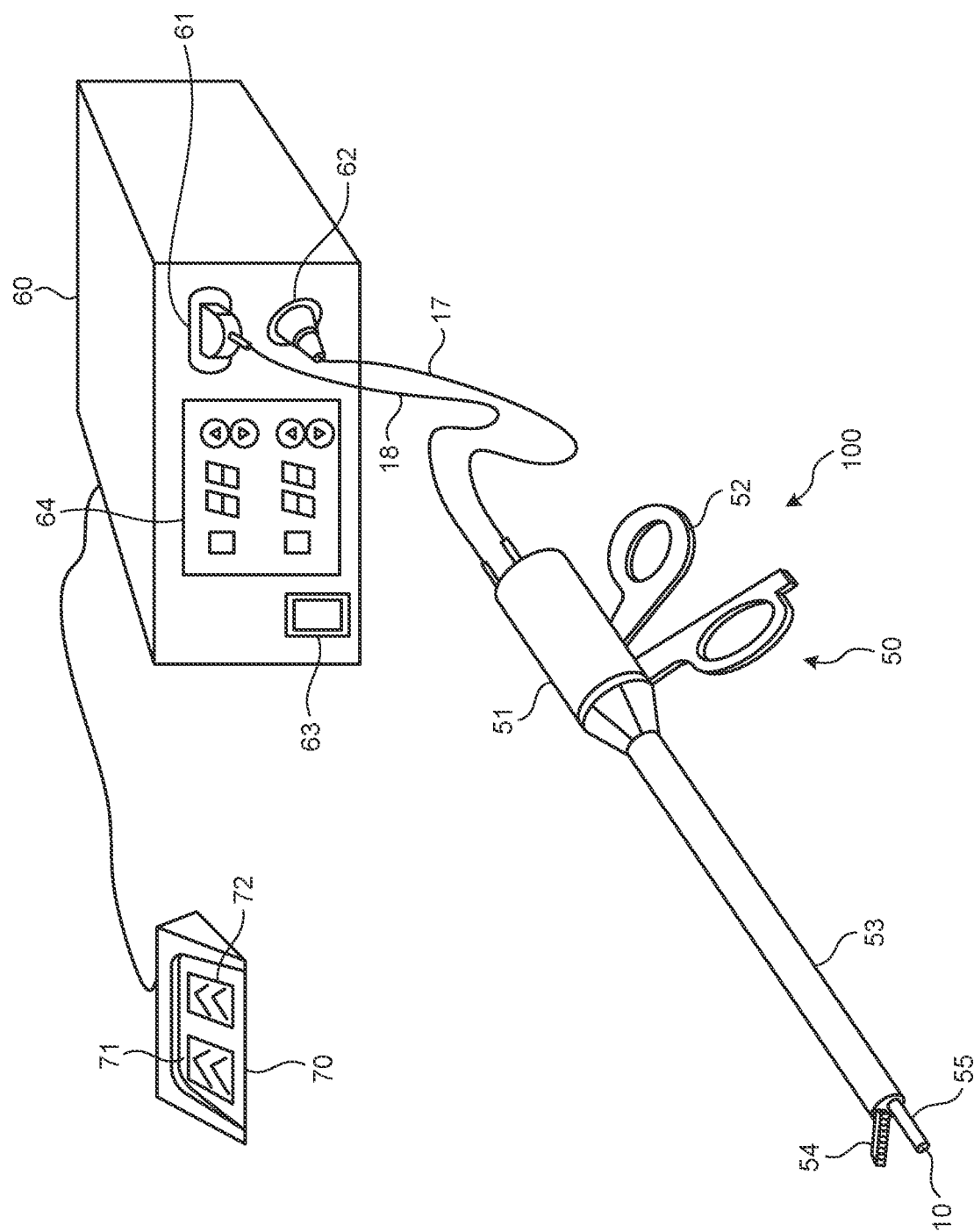
FIG. 1 is a view schematically illustrating a schematic configuration of a therapeutic treatment apparatus according to an embodiment of the disclosure.

Hereinafter, embodiments of a heating blade unit and a treatment tool according to the disclosure will be described with reference to the drawings. The disclosure is not limited to the following embodiments. Moreover, in the description of the drawings, the same parts are denoted by the same reference numerals. In addition, it should be noted that the drawings are schematic, and a dimensional relationship of each element, a ratio of each element, and the like may be different from the reality. Parts of the drawings having different dimensional relationships and ratios may be included.

FIG. 1 is a schematic view illustrating a schematic configuration of a therapeutic treatment apparatus according to an embodiment of the disclosure. A therapeutic treatment apparatus 100 is an apparatus that causes heat energy and high frequency energy to act on a biological tissue, and includes a treatment tool 50, a control device 60, and a foot switch 70.

The treatment tool 50 is, for example, a linear type surgical treatment tool for performing treatment by penetrating the abdominal wall. The treatment tool 50 includes a handpiece body 51, a handle 52, a shaft 53 attached to the handpiece body 51, and a pair of grippers 54 and 55 provided at a distal end of the shaft 53. The gripper 54 and the gripper 55 are connected to the distal end portion of the shaft 53 so as to be rotatable about a rotation pin (not illustrated). When the handle 52 is operated, the gripper 54 is driven to open and close with respect to the gripper 55, and a biological tissue is pinched between the gripper 55 and the gripper 54. A heating blade unit 10 that performs treatment such as coagulation and incision of a biological tissue using heat energy is attached to the gripper 55. In addition, the gripper 54 and the gripper 55 are formed of a bipolar electrically conductive portion, and have a function as a bipolar electric scalpel that performs treatment such as coagulation and incision on a biological tissue using high frequency energy. In the present specification, a side of the gripper 54 and the gripper 55 is referred to as a distal end side, and a side if the handpiece body 51 is referred to as a proximal end side. The shape of the treatment tool 50 illustrated in FIG. 1 is an example, and other shapes may be used as long as they have the same function.

The handpiece body 51 is detachably connected to the control device 60 via a heater electric wire 17, a connector 62, a high frequency electric wire 18, and a connector 61. The foot switch 70 is detachably connected to the control device 60. A first pedal 71 of the foot switch 70 drives a heater output circuit that supplies electric energy to the heating blade unit 10, and a second pedal 72 drives a high frequency output circuit that supplies electric energy to the bipolar electrically conductive portions of the gripper 54 and the gripper 55. In addition to a power switch 63, a panel 64 provided with buttons for setting the magnitude of each output and assigning the function of the foot switch 70 is provided on the front surface of the control device 60. The foot switch 70 may be replaced with a switch operated by hand or another switch.

Figure 2:
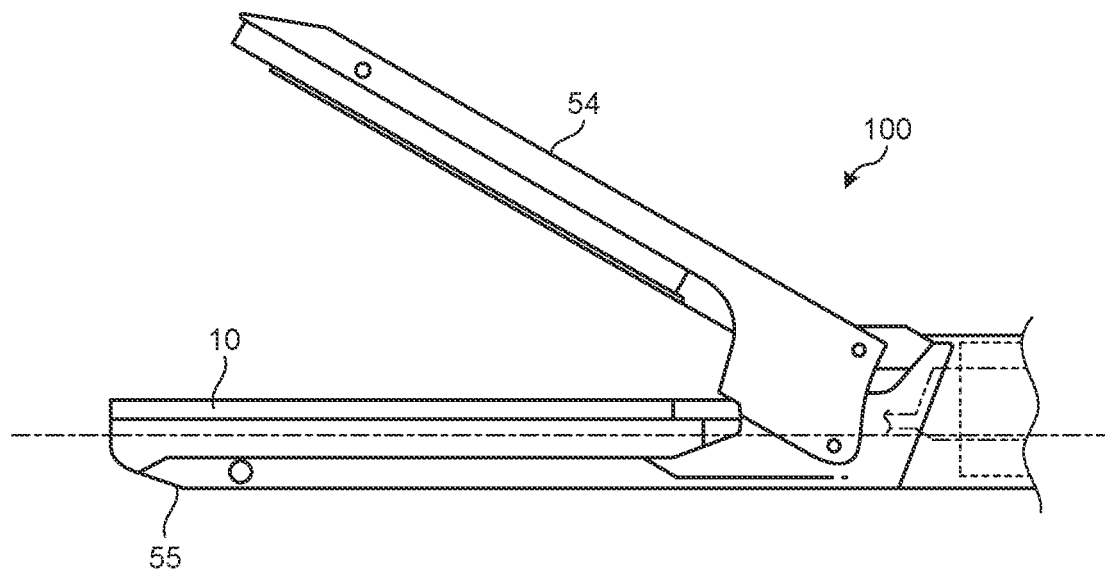
FIG. 2 is a side view of a heating blade unit used in the therapeutic treatment apparatus illustrated in FIG. 1.
Figure 3:
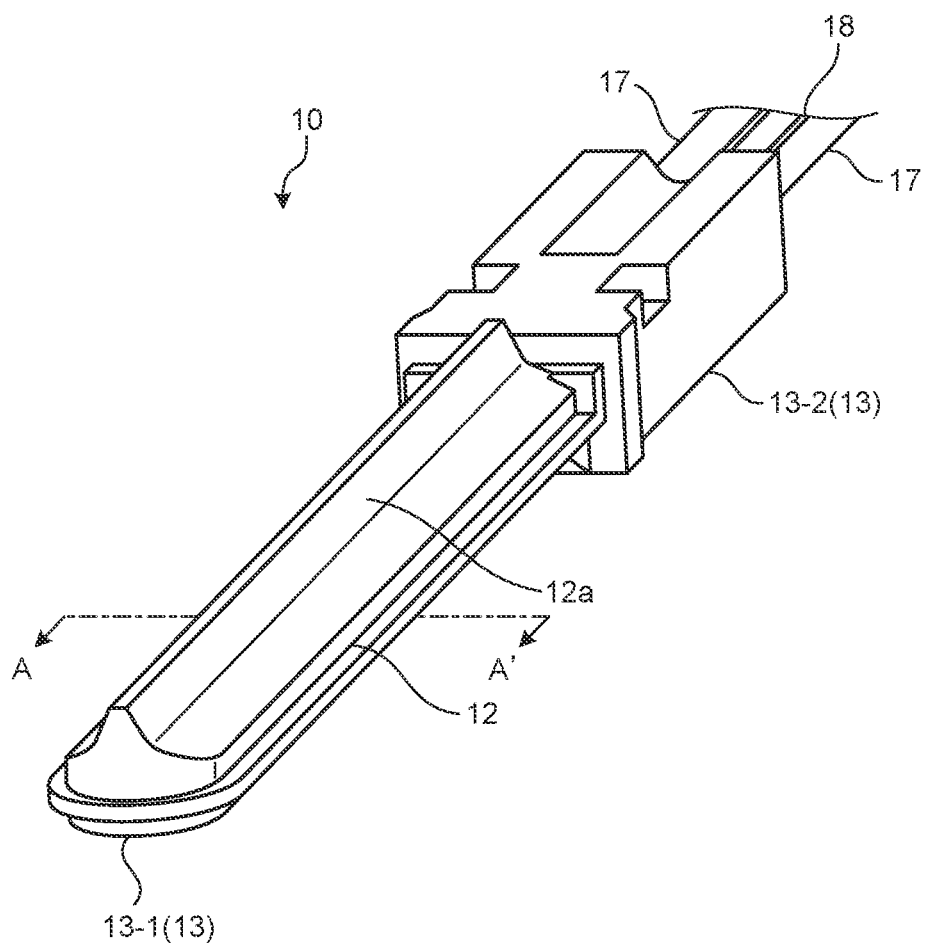
FIG. 3 is a perspective view of the heating blade unit used in the therapeutic treatment apparatus illustrated in FIG. 1.
Figure 4:
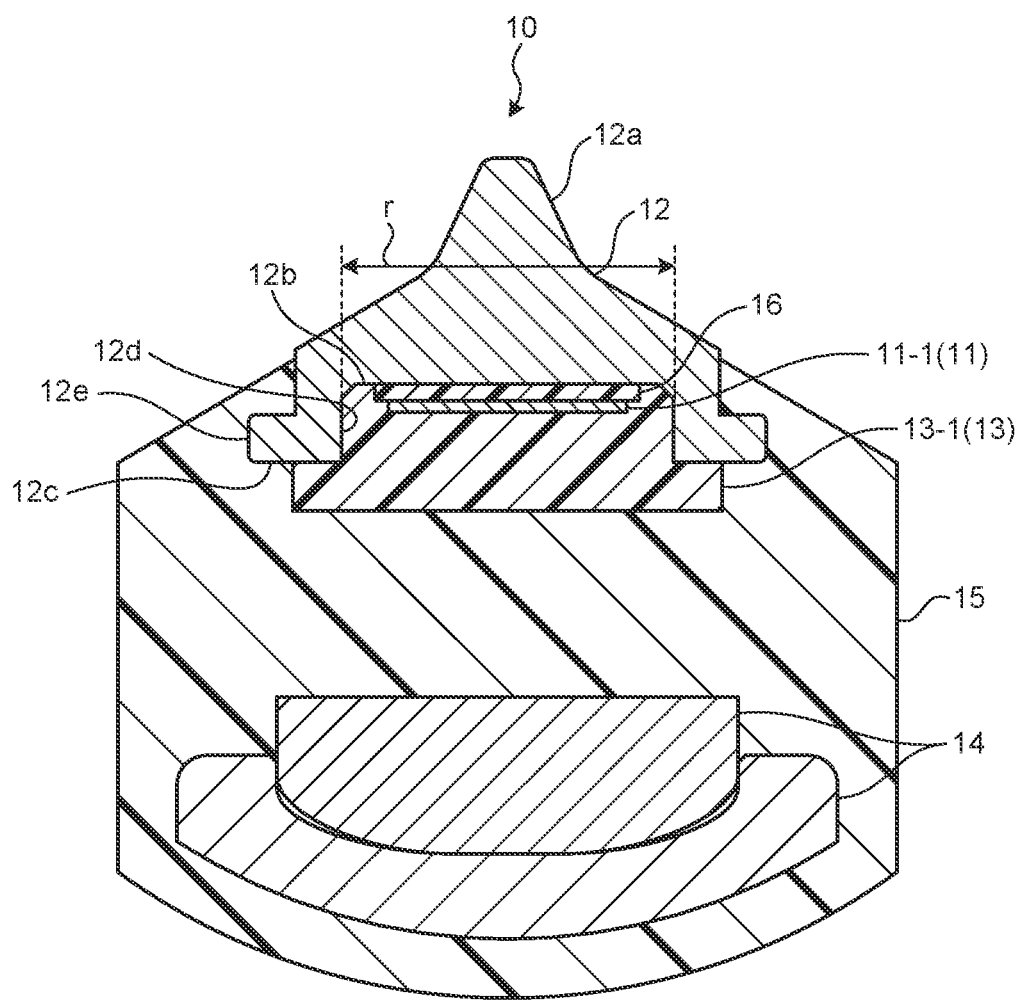
FIG. 4 is a cross-sectional view of the heating blade unit of FIG. 3.

FIG. 2 is a side view of the heating blade unit 10 used in the therapeutic treatment apparatus 100 illustrated in FIG. 1, FIG. 3 is a perspective view of the heating blade unit 10 used in the therapeutic treatment apparatus 100 illustrated in FIG. 1, and FIG. 4 is a cross-sectional view in a direction orthogonal to an extending direction of a blade of the heating blade unit 10 in FIG. 3(A-A' cross section). Note that, in FIG. 3, illustration of a holder to be described later is omitted. The heating blade unit 10 includes an electric heater 11, a blade 12, a cover 13, a frame 14, and a holder 15.

The electric heater 11 has a thin plate shape in which a resistance pattern for heat generation is formed on a sheet-shaped substrate, and a connection portion is provided at each end of the resistance pattern. The resistance pattern of the electric heater 11 generates heat to a temperature at which the surface temperature of the blade 12 is 200° C. or higher and 350° C. or lower. The heater electric wire 17 is connected to each connection portion. The electric heater 11 is connected to the heater electric wire 17 by a method that does not damage the electric heater 11 and the heater electric wire 17 even when a molding temperature and molding pressure of the cover 13 are received, for example, spot welding, high melting point solder, caulking, or the like. The electric heater 11 includes a first heater portion 11-1 adhered to the blade 12 and a second heater portion 11-2 extending from the proximal end side in the extending direction of the blade (see FIGS. 5A to 7C). In the second heater portion 11-2, a resistance pattern is also formed together with the connection portion.

The blade 12 is made of an electrically conductive material, for example, a metal such as copper, aluminum, stainless steel, or brass, a resin coated with an electrically conductive coat, ceramic, or the like, and a treatment surface 12a for performing treatment on a biological tissue is formed such that a side of the gripper 54 that faces the treatment surface 12a, as illustrated in FIG. 1, is formed into a protrusion. The shape of the treatment surface 12a may be a planar shape or a recessed shape as long as the treatment surface 12a can grip the biological tissue together with the gripper 54. A groove portion illustrated in FIG. 4 is formed on the opposite side of the treatment surface 12a, and a bottom surface of the groove portion is an installation surface 12b on which the electric heater 11 is installed. The electric heater 11 is adhered in close contact with the installation surface 12b of the blade 12 by an insulating sheet-like adhesive layer 16. In addition, a flange portion 12e is provided on a side opposite to the treatment surface 12a. A surface of the flange portion 12e opposite to the treatment surface 12a is a support surface 12c that adheres to and is sealed with the cover 13 and the holder 15 to be described later and supports the blade 12.

The high frequency electric wire 18 is connected to the support surface 12c on the proximal end side of the blade 12 (see FIGS. 5A to 5D and FIGS. 6A to 6C). By supplying a high frequency current from the high frequency electric wire 18 to the blade 12 together with the high frequency electric wire connected to the blade of the gripper 54, the biological tissue gripped by the gripper 54 and the gripper 55 is cauterized.

Conventionally, a thermoplastic resin such as a polyether ether ketone resin (PEEK resin) has been considered as a material of a cover for adhering and fixing, and sealing the electric heater 11. However, the PEEK resin requires a very high temperature and pressure such as a molding temperature of 380 to 400° C. and an injection pressure of 100 to 200 MPa, and there is a possibility that the electric heater 11 and the adhesive layer 16 are damaged during molding. In addition, a difference in linear expansion coefficient is large between the PEEK resin and the like and the blade material, and there is a possibility that a very large thermal stress is imposed on the adhesive interface between the blade and the cover due to thermal stress after molding, when the treatment tool is sterilized, or when the electric heater is heated, and the strength of the adhesive interface between the blade and the cover is reduced. In the present embodiment, by using, as the cover 13, a thermosetting resin that can be molded at a molding temperature of about 80° C. and a molding pressure of about 20 MPa by transfer molding, damage to the electric heater 11 and the adhesive layer 16 is reduced. In addition, by using a thermosetting resin having a small linear expansion coefficient, the stress imposed on the adhesive interface at the time of thermal expansion and thermal contraction is reduced, and the strength of the adhesive portion can be maintained high. As the above-described thermosetting resin, a phenol resin, an epoxy resin, a melamine resin, a urea resin, a polyurethane resin, a silicone resin, a polyester resin, and the like can be used, and an epoxy resin is preferable from the viewpoint of adhesiveness and heat resistance.

Figure 5A:
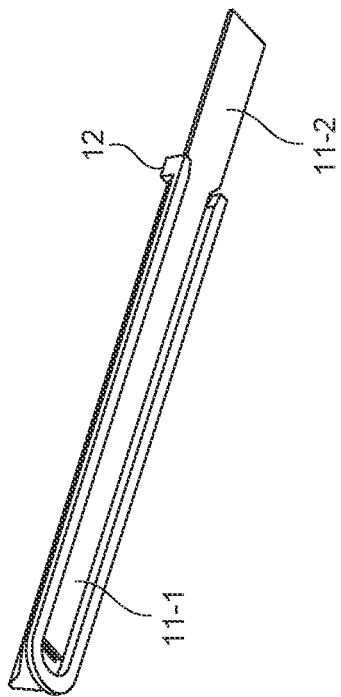
FIGS. 5A to 5D are views for explaining manufacturing of the heating blade unit of FIG. 3.
Figure 5B:
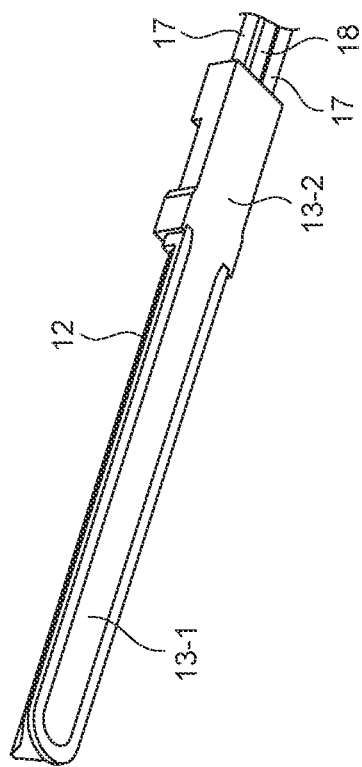
Figure 5C:
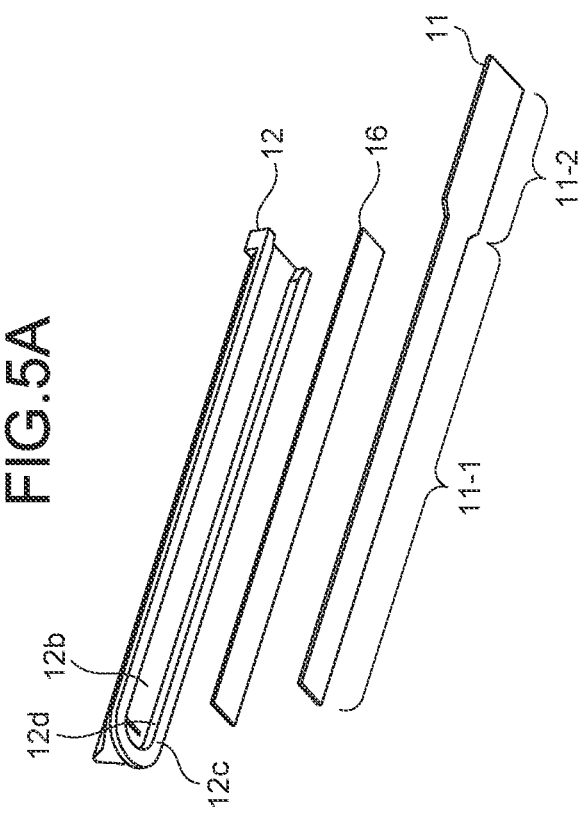
Figure 5D:
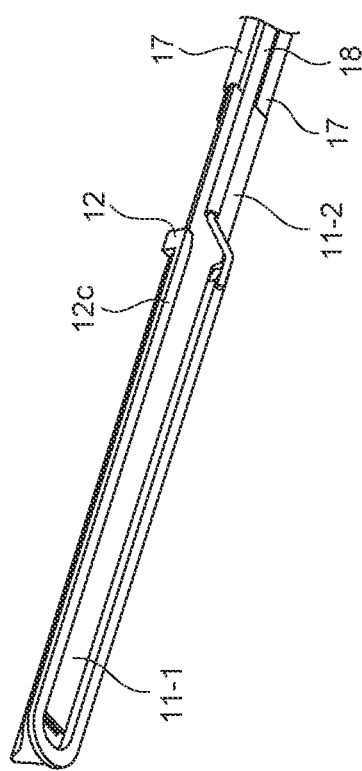

As illustrated in FIG. 5D, the cover 13 includes a first cover 13-1 covering the first heater portion 11-1 and a second cover 13-2 covering the second heater portion 11-2. The first cover 13-1 integrally covers and seals the first heater portion 11-1 including the installation surface 12b, the support surface 12c, and a stepped surface 12d between the installation surface 12b and the support surface 12c. In the present embodiment, a groove portion is provided in the blade 12, and the cover 13 adheres to and seals the electric heater 11 and the blade 12 on three surfaces on the installation surface 12b side which is a bottom surface of the groove portion, on the stepped surface 12d side which is a side surface, and on the support surface 12c side, so that an adhesion area to be sealed is increased, and adhesive strength can be improved by having adhesion surfaces in a plurality of directions. Accordingly, even when thermal stress is imposed on the adhesive interface, it is possible to prevent breakage of the adhesive portion. The second cover 13-2 integrally covers the second heater portion 11-2, an end portion of the heater electric wire 17 connected to the second heater portion 11-2, and an end portion of the high frequency electric wire 18.

The thermosetting resin used for the cover 13 has a small difference in linear expansion coefficient from aluminum or the like used for the blade as compared with a thermoplastic resin such as a PEEK resin, but preferably includes a filler for adjusting the linear expansion coefficient in order to further alleviate thermal stress generated during thermal expansion and thermal contraction. The linear expansion coefficient of the thermosetting resin including the filler is preferably adjusted to be substantially equal to the linear expansion coefficient of the blade, that is, approximately 50 to 150% of the linear expansion coefficient of the blade.

The frame 14 illustrated in FIG. 4 is made of a metal material such as stainless steel. The frame 14 extends in the same direction as the blade 12 and ensures the strength of the heating blade unit 10. The frame 14 and the blade 12 are held by the holder 15 made of resin.

Next, manufacturing of the heating blade unit 10 will be described. FIGS. 5A to 5D are views for explaining manufacturing of the heating blade unit 10.

As illustrated in FIGS. 5A and 5B, first, the first heater portion 11-1 of the electric heater 11 is adhered to the installation surface 12b of the groove portion of the blade 12 using the sheet-like adhesive layer 16, and is brought into close contact with the installation surface 12b. The joining of the electric heater 11 by the adhesive layer 16 is performed by hot pressing.

Figure 6A:
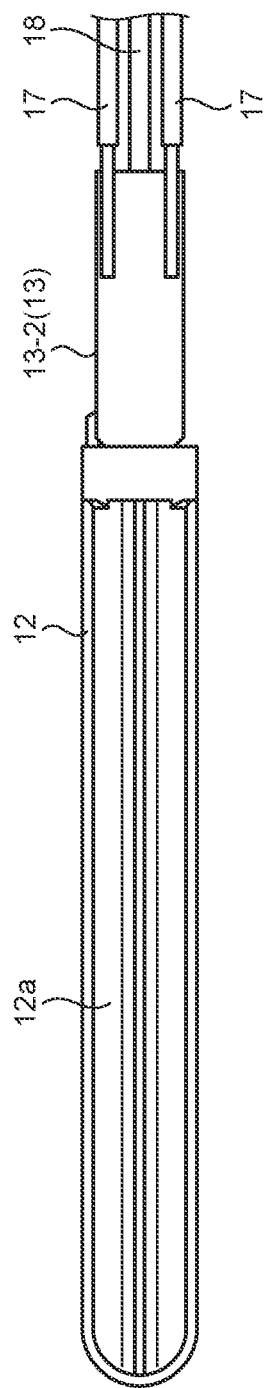
FIGS. 6A to 6C are views for explaining manufacturing of the heating blade unit of FIG. 3.
Figure 6B:
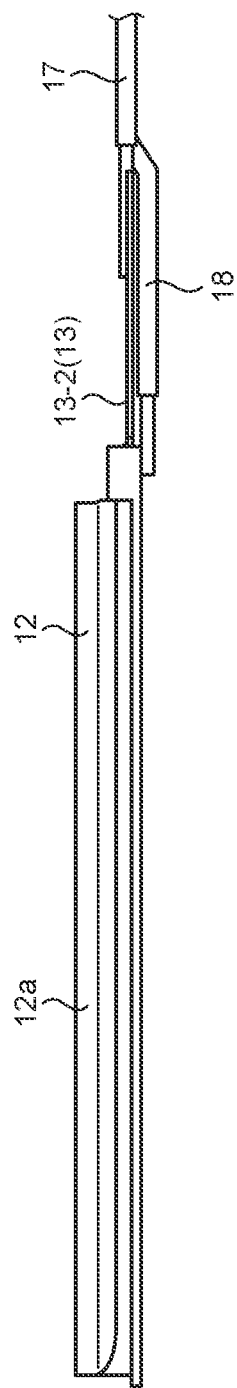
Figure 6C:
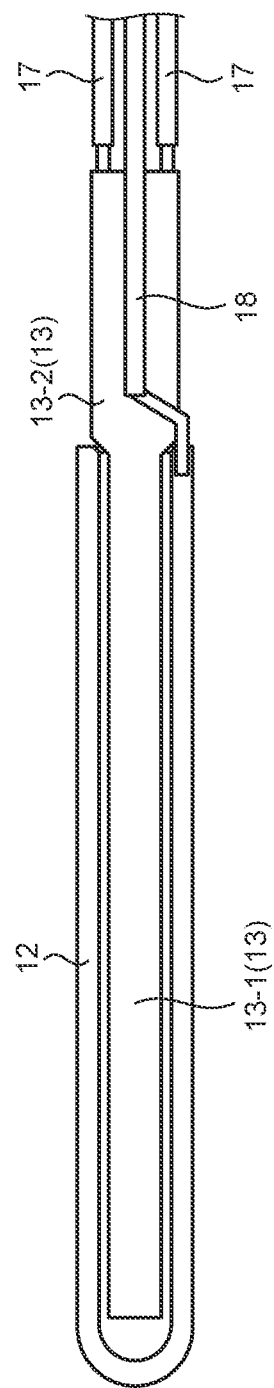

Thereafter, as illustrated in FIG. 5C, the two heater electric wires 17 are respectively connected to the connection portion disposed in the second heater portion 11-2 of the electric heater 11, and the high frequency electric wire 18 is connected to the surface on the proximal end side of the support surface 12c of the blade 12. The heater electric wires 17 and the high frequency electric wire 18 are connected by spot welding or the like. FIG. 6A is a top view, FIG. 6B is a side view, and FIG. 6C is a bottom view of the heating blade unit after FIG. 5C. The two heater electric wires 17 are preferably disposed and connected within a range of a width (r in FIG. 4) of the installation surface 12b when viewed from the extending direction of the blade 12. The high frequency electric wire 18 is disposed between the two heater electric wires 17 on a side opposite to the surface of the electric heater 11 to which the heater electric wires 17 are connected, that is, across the heater electric wires 17 and the electric heater 11. As a result, the width of the second cover 13-2 covering the second heater portion 11-2 can be reduced. After the electric heater 11 to which the heater electric wires 17 are connected is adhered to the blade 12, the high frequency electric wire 18 may be connected to the blade 12.

Figure 7A:
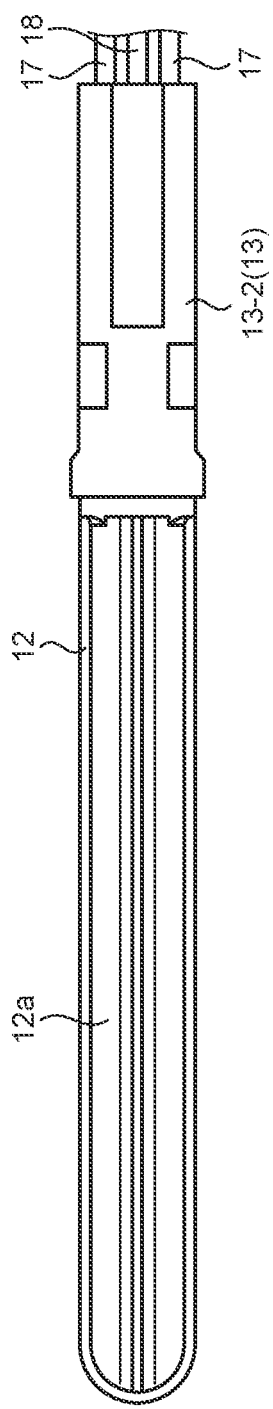
FIGS. 7A to 7C are views for explaining manufacturing of the heating blade unit of FIG. 3.
Figure 7B:
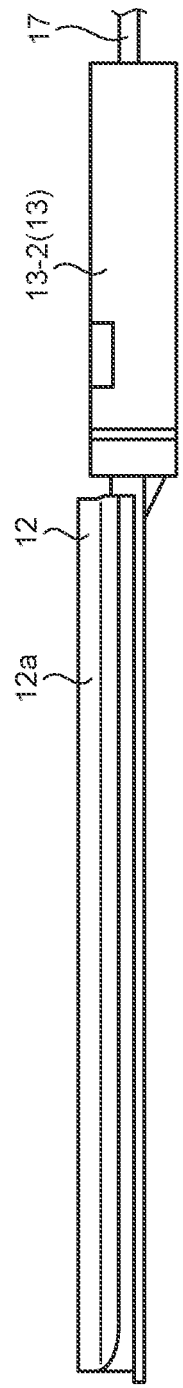
Figure 7C:
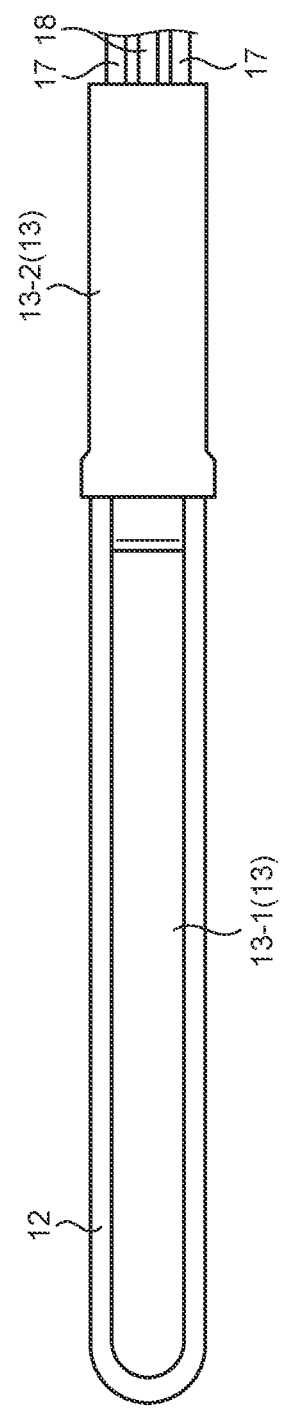

Subsequently, as illustrated in FIG. 5D, the electric heater 11 is covered with the cover 13. FIG. 7A is a top view, FIG. 7B is a side view, and FIG. 7C is a bottom view of the heating blade unit 10 after FIG. 5D is assembled. In order to improve the adhesive strength between the blade 12 and the cover 13, the blade 12 is preferably subjected to a surface roughening treatment in advance. By performing the surface roughening treatment on the blade 12 in advance, the adhesive strength with the cover 13 is improved, the adhesion between the blade 12 and the adhesive layer 16 is also improved, and the thermal conductivity from the electric heater 11 to the blade 12 is also improved. The surface roughening treatment can be performed by wet etching, laser, anodization treatment, or the like.

End portions of the heater electric wires 17 and the high frequency electric wire 18 are also covered with the cover 13. Here, in order to prevent a short circuit and a change in resistance due to water immersion from the adhesive interface between the electric wires and the cover 13, it is preferable that the end portions of the insulating outer coatings of the heater electric wires 17 and the high frequency electric wire 18 are subjected to a surface modification treatment for improving the sealing strength of the adhesive portions in advance. When a fluorine-based resin is used as the insulating outer coatings, tetraetch treatment and primer treatment are exemplified as the surface modification treatment. In addition, when the PEEK resin is used, it is preferable to use an insulating outer coating made of a resin having a low crystallinity. Alternatively, the water tightness can be improved by using a single wire as the core wires of the heater electric wires 17 and the high frequency electric wire 18.

Figure 8:
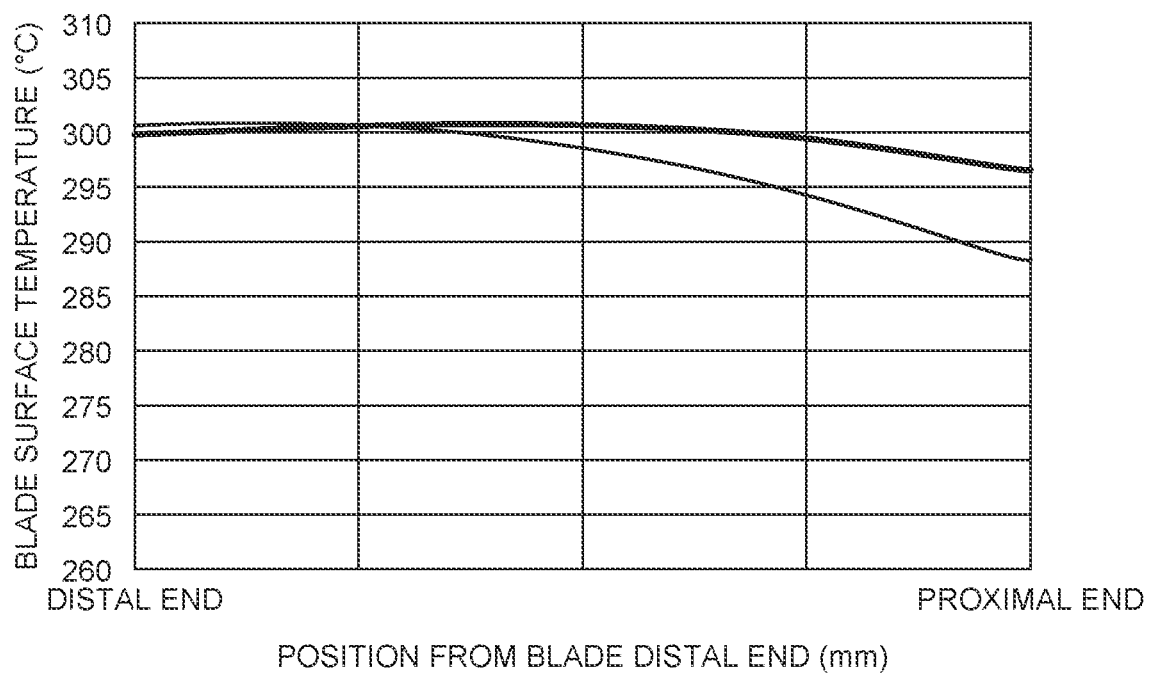
FIG. 8 is a graph illustrating a relationship between a position and a temperature of a blade when a resistance pattern is provided in a second heater portion (thick line) and when a resistance pattern is not provided (thin line)

In the present embodiment, the first heater portion 11-1 and the second heater portion 11-2 have resistance patterns for generating heat, and the first heater portion 11-1 is covered with the first cover 13-1, and the second heater portion 11-2 is covered with the second cover 13-2, respectively. By providing the resistance pattern in the second heater portion 11-2, it is possible to suppress a decrease in temperature on the proximal end side of the blade 12. FIG. 8 is a graph illustrating a relationship between a position of the blade and a temperature when a resistance pattern is provided in the second heater portion 11-2 (thick line) and when a resistance pattern is not provided (thin line). As illustrated in FIG. 8, when the resistance pattern is provided in the second heater portion 11-2 (thick line), the temperature on the proximal end side of the blade 12 is held higher by nearly 10° C. than when the resistance pattern is not provided (thin line), and the uniformity of the temperature of the blade 12 can be secured.

After the cover 13 is formed in this manner, the holder 15 is molded by injection molding or the like in a state where the frame 14 and the blade 12 are fixed with a jig or the like, thereby manufacturing the heating blade unit 10.

In the blade 12 subjected to a surface roughening treatment, a biological tissue is easily stuck to the treatment surface 12a when the biological tissue is treated. Therefore, it is preferable that the blade 12 is further subjected to a surface treatment for preventing sticking of a biological tissue. Examples of the surface treatment for preventing sticking include Ni-PTFE plating and fluororesin coating. The surface treatment for preventing sticking is preferably performed after the cover 13 is formed. By performing the surface treatment for preventing sticking after forming the cover 13, the cover 13 serves as a substitute for masking, and thus masking is not necessary, and the cost can be reduced.

In the present embodiment, the electric heater 11 adhered to the blade 12 by the adhesive layer 16 is covered with the cover 13 made of a thermosetting resin, and the cover 13 is adhered to the electric heater 11 and the blade 12 on three surfaces on the installation surface 12b side, the support surface 12c side, and the stepped surface 12d side to be sealed. As a result, the sealing strength of the adhesive portion can be improved, and a short circuit caused by water immersion due to breakage of the adhesive interface can be prevented. In addition, in the present embodiment, since a thermosetting resin having a small difference in linear expansion coefficient from a material constituting the blade 12 is used as the cover 13, thermal stress at the time of thermal expansion and contraction due to repetition of heating and cooling can be reduced, and the load of thermal stress on the adhesive interface can be reduced.

Figure 9:
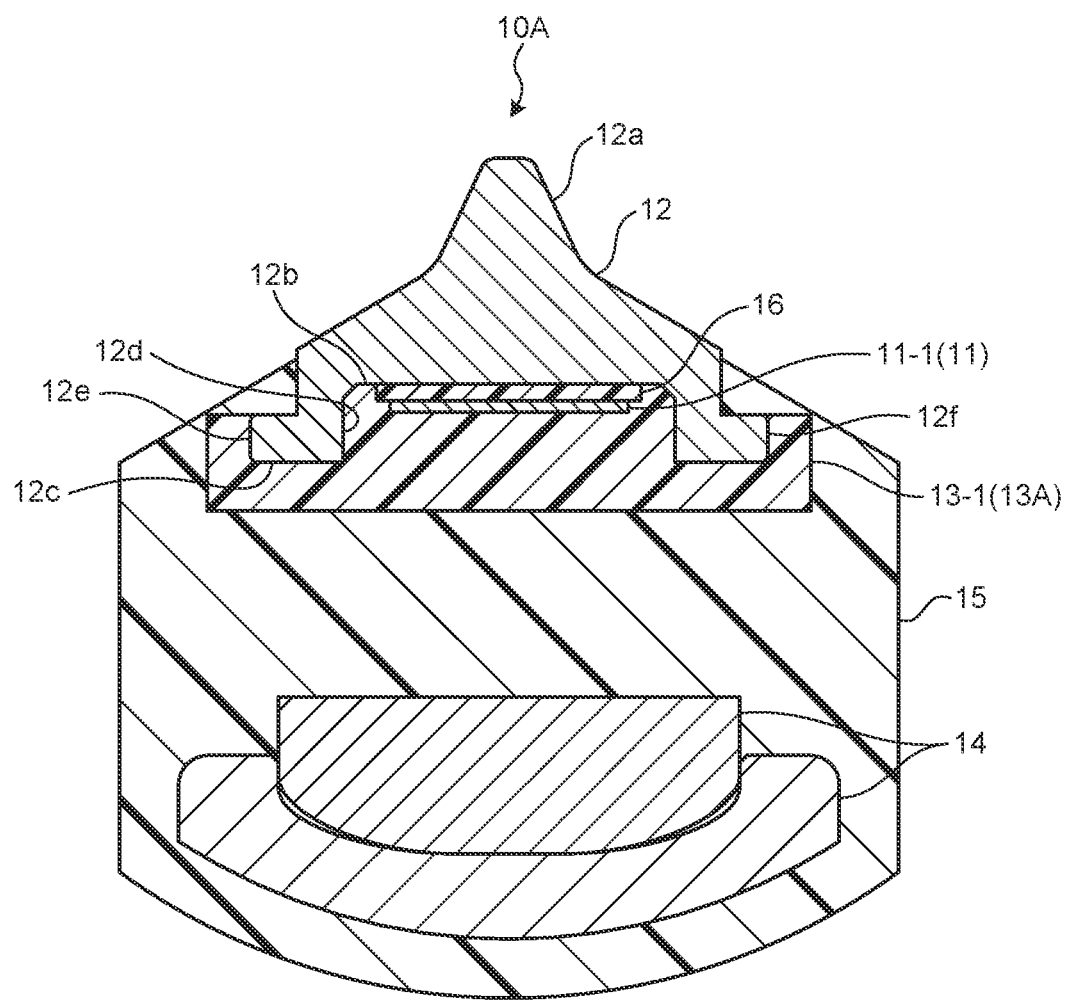
FIG. 9 is a cross-sectional view of a heating blade unit according to an embodiment.

In the above-described embodiment, the cover 13 adheres to and seals the electric heater 11 and the blade 12 on three surfaces on the installation surface 12b side, the support surface 12c side, and the stepped surface 12d side. However, the cover 13 and the blade 12 may be adhered to each other and sealed on three or more surfaces, or may be adhered to each other and sealed on four surfaces. FIG. 9 is a cross-sectional view of a heating blade unit 10A. In the heating blade unit 10A, a cover 13A covers not only the installation surface 12b side, the support surface 12c side, and the stepped surface 12d side but also a side surface 12f side of the flange portion 12e, that is, adheres to and seals the electric heater 11 and the blade 12 on four surfaces. As a result, it is possible to further increase the sealing area by adhesion, and it is possible to further improve the sealing strength of the adhesive portion.

Figure 10:
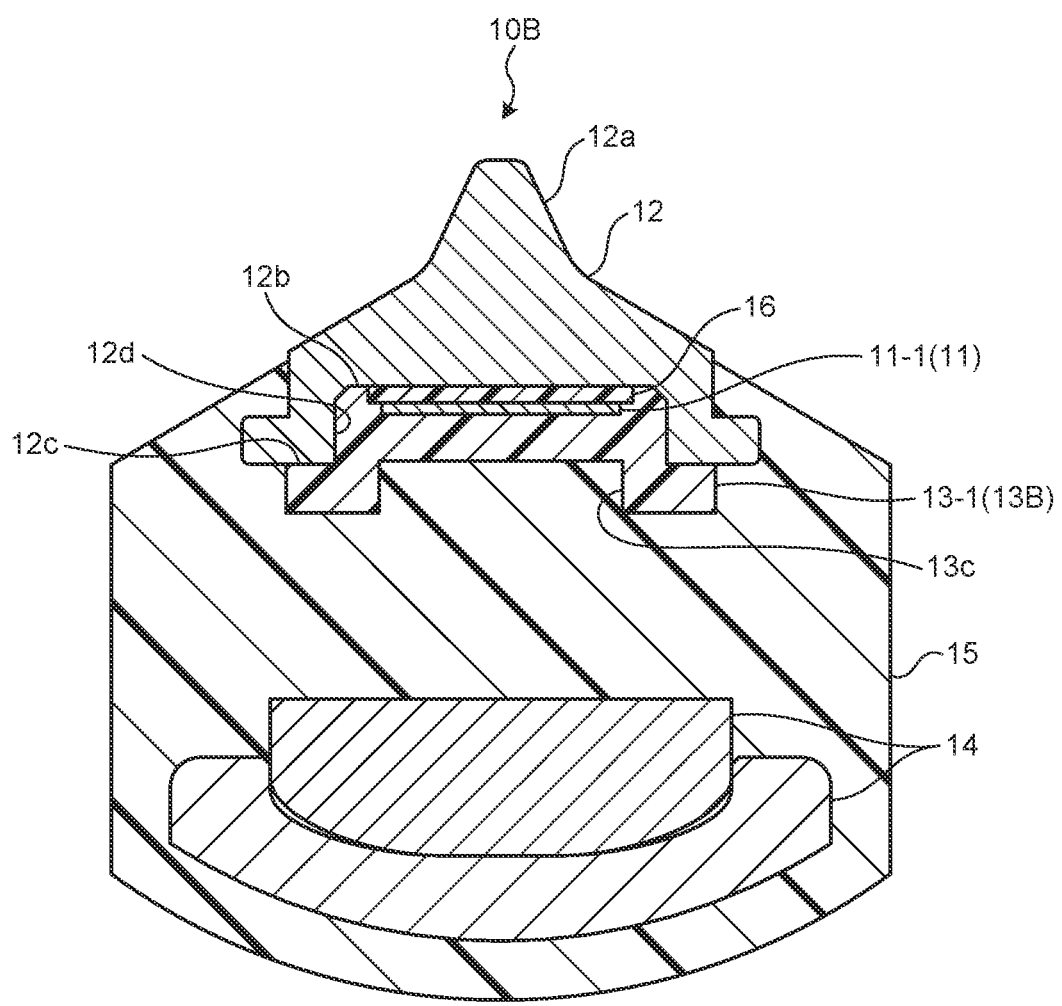
FIG. 10 is a cross-sectional view of a heating blade unit according to an embodiment.

FIG. 10 is a cross-sectional view of a heating blade unit 10B. In the heating blade unit 10B, a groove portion 13c is formed on a surface of a cover 13B opposite to a surface in contact with the electric heater 11. In the heating blade unit 10B, by providing the groove portion 13c in the cover 13B, the amount of thermosetting resin to be used can be reduced, heat transfer from the electric heater 11 to the frame 14 and the holder 15 through the cover 13B can be reduced, and thermal invasion to a living body by the holder 15 and the like can be prevented. In addition, since heat dissipation due to heat transfer to the frame 14 and the holder 15 can be reduced, the blade 12 can be efficiently maintained at a high temperature.

Figure 11:
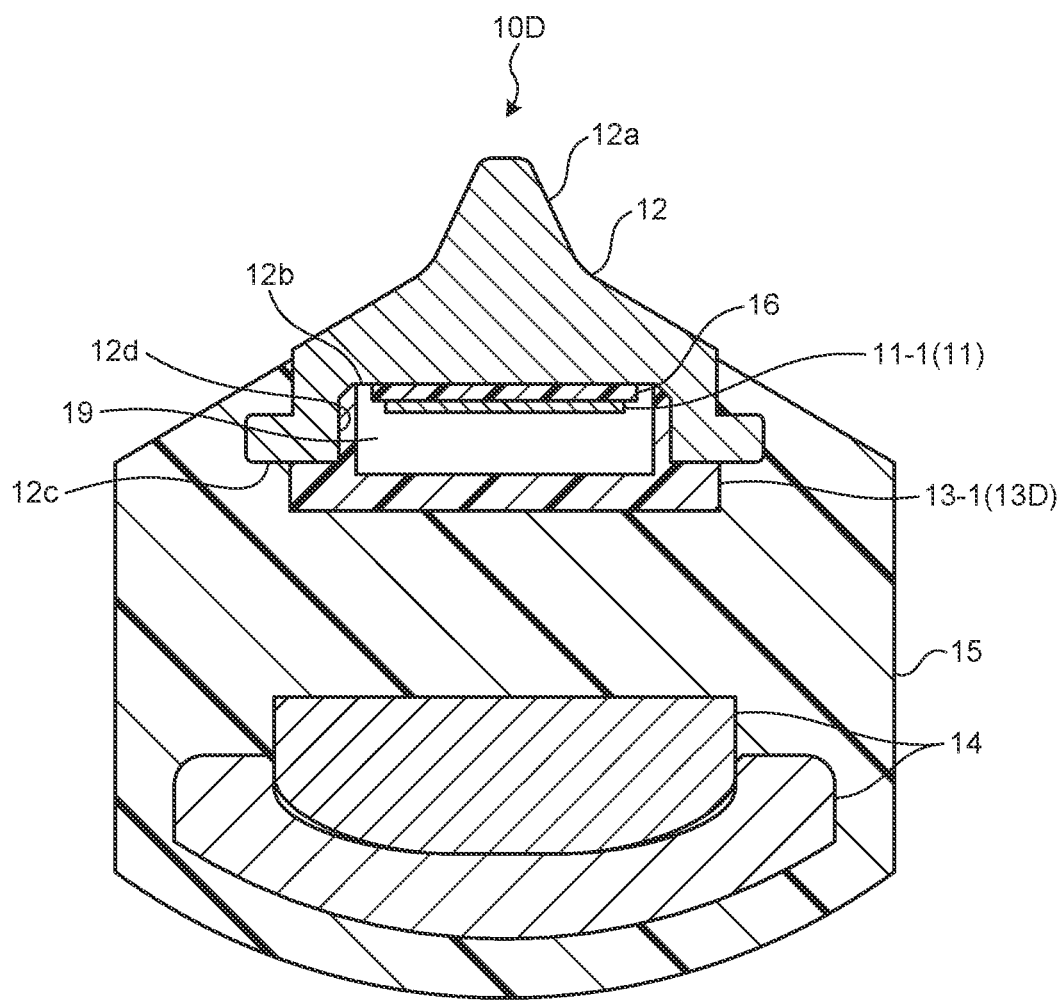
FIG. 11 is a cross-sectional view of a heating blade unit according to an embodiment.

FIG. 11 is a cross-sectional view of a heating blade unit 10D. In the heating blade unit 10D, an air layer 19 is provided between a cover 13D and the electric heater 11. The air layer 19 is provided in an area extending in the same direction as the electric heater 11. In the heating blade unit 10D, by providing the air layer 19 having a low thermal conductivity between the cover 13D and the electric heater 11, heat transfer to the holder 15 and the frame 14 through the cover 13D can be further reduced, and thermal invasion to a living body by the holder 15 and the like can be prevented. In addition, since heat dissipation due to heat transfer to the frame 14 and the holder 15 can be reduced, the blade 12 can be efficiently maintained at a high temperature.

Figure 12:
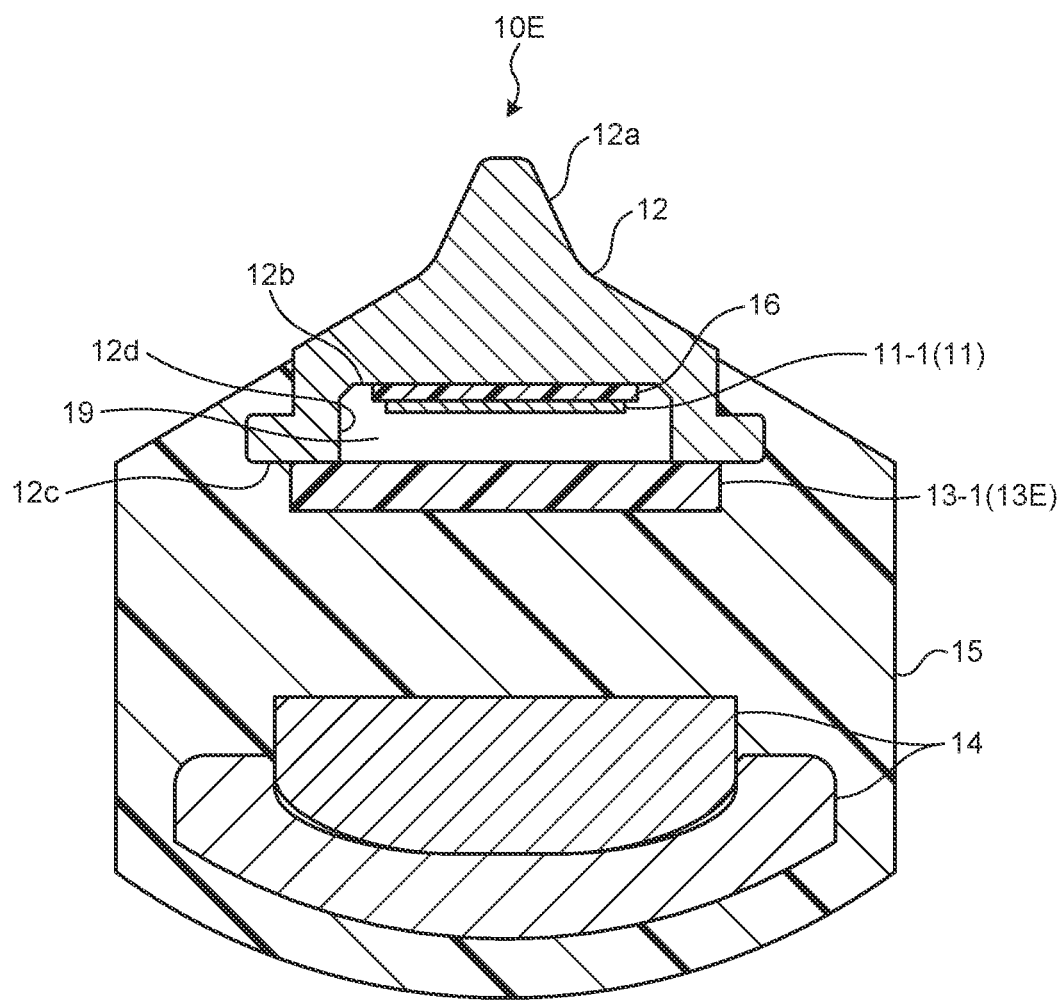
FIG. 12 is a cross-sectional view of a heating blade unit according to an embodiment.

FIG. 12 is a cross-sectional view of a heating blade unit 10E. In the heating blade unit 10E, a cover 13E covers only the support surface 12c. In the heating blade unit 10E, by providing the air layer 19 having a low thermal conductivity between the cover 13E and the electric heater 11, heat transfer to the holder 15 and the frame 14 through the cover 13E can be further reduced, and thermal invasion to a living body by the holder 15 and the like can be prevented. In addition, since heat dissipation due to heat transfer to the frame 14 and the holder 15 can be reduced, the blade 12 can be efficiently maintained at a high temperature.

Figure 13:
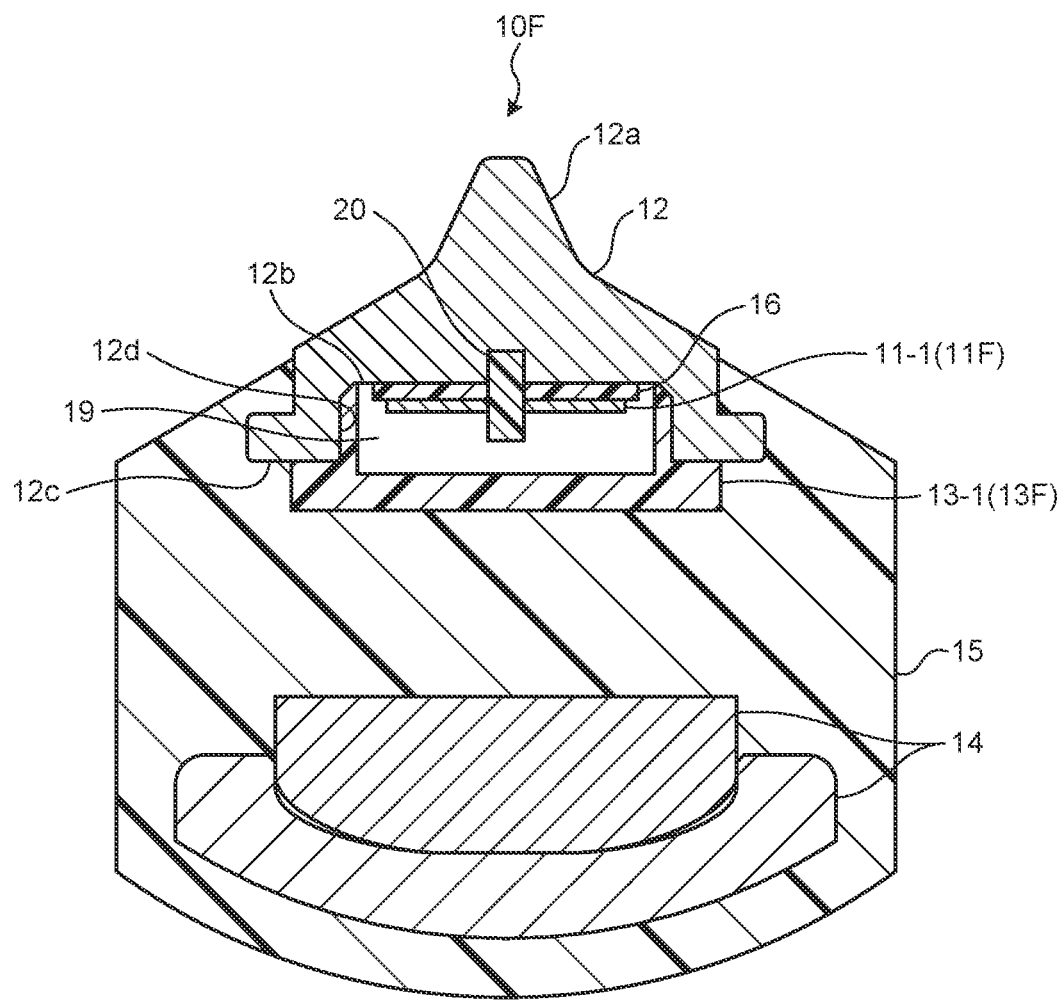
FIG. 13 is a cross-sectional view of a heating blade unit according to an embodiment.
Figure 14:
FIG. 14 is a plan view of an electric heater used in the heating blade unit of FIG. 13.

FIG. 13 is a cross-sectional view of a heating blade unit 10F. In the heating blade unit 10F, the air layer 19 is provided between a cover 13F and an electric heater 11F, a groove is further provided on the installation surface 12b of the blade 12, and an insulating material 20 having thermal conductivity is disposed so as to insulate a U-shaped portion of the electric heater 11F as a U-shaped heater as illustrated in FIG. 14 from the groove. The air layer 19 and the insulating material 20 are provided in a state of extending in the same direction as the electric heater 11F. In the heating blade unit 10F, by providing the air layer 19 having a low thermal conductivity between the cover 13F and the electric heater 11F, heat transfer to the holder 15 and the frame 14 through the cover 13F can be further reduced, and thermal invasion to a living body by the holder 15 and the like can be prevented. In addition, since heat dissipation due to heat transfer to the frame 14 and the holder 15 can be reduced, the blade 12 can be efficiently maintained at a high temperature. Furthermore, by providing the insulating material 20 having thermal conductivity, a short circuit between heaters can be reliably prevented, and thermal conductivity from the electric heater 11F to the blade 12 can be improved by the insulating material 20 having thermal conductivity.

Figure 15:
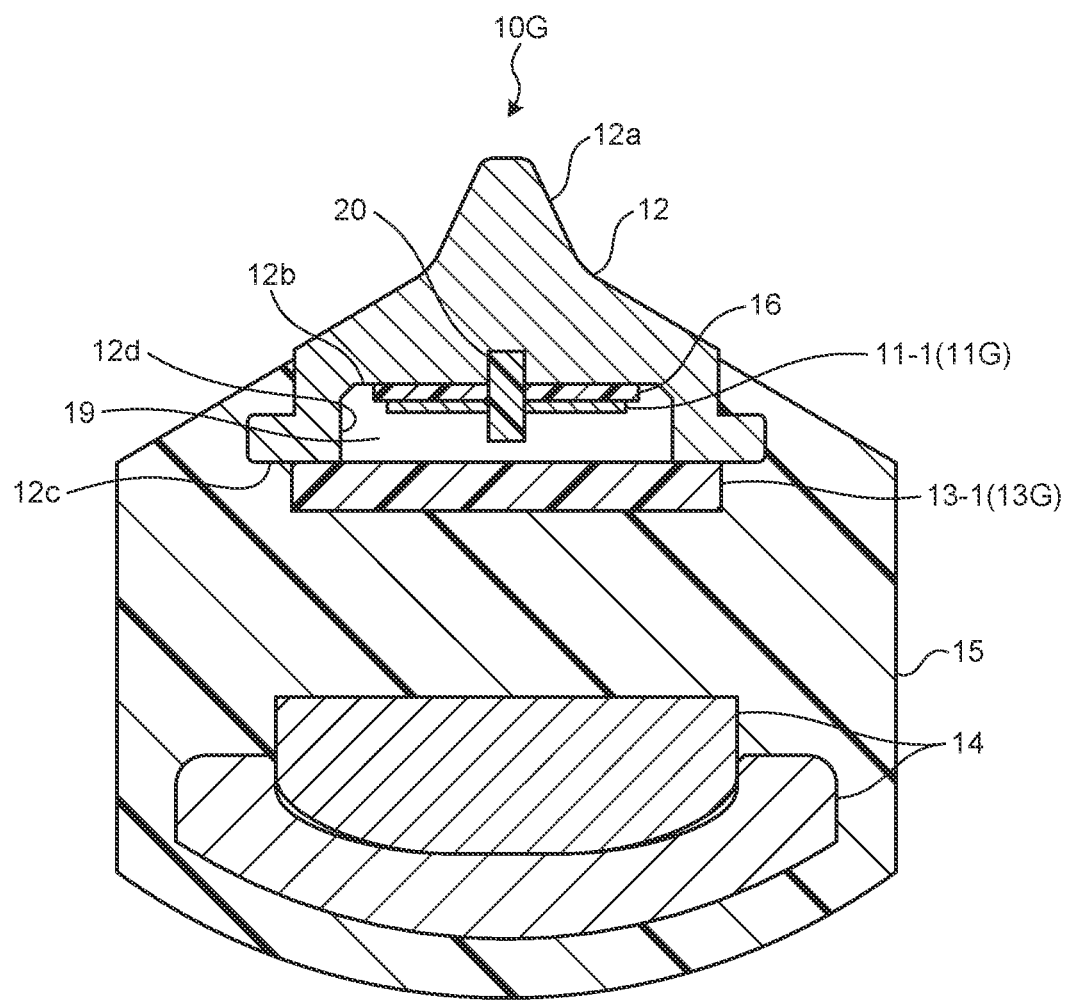
FIG. 15 is a cross-sectional view of a heating blade unit according to an embodiment.

FIG. 15 is a cross-sectional view of a heating blade unit 10G. In the heating blade unit 10G, the air layer 19 is provided between a cover 13G and an electric heater 11G, and the insulating material 20 having thermal conductivity is disposed between the electric heater 11G which is a U-shaped heater. In the heating blade unit 10G, the cover 13G covers only the support surface 12c. The air layer 19 and the insulating material 20 are provided in a state of extending in the same direction as the electric heater 11G. In the heating blade unit 10G, by providing the air layer 19 having a low thermal conductivity between the cover 13G and the electric heater 11G, heat transfer to the holder 15 and the frame 14 through the cover 13G can be further reduced, and thermal invasion to a living body by the holder 15 and the like can be prevented. In addition, since heat dissipation due to heat transfer to the frame 14 and the holder 15 can be reduced, the blade 12 can be efficiently maintained at a high temperature. Furthermore, by providing the insulating material 20 having thermal conductivity, a short circuit between heaters can be reliably prevented, and thermal conductivity from the electric heater 11G to the blade 12 can be improved by the insulating material 20 having thermal conductivity.

Figure 16:
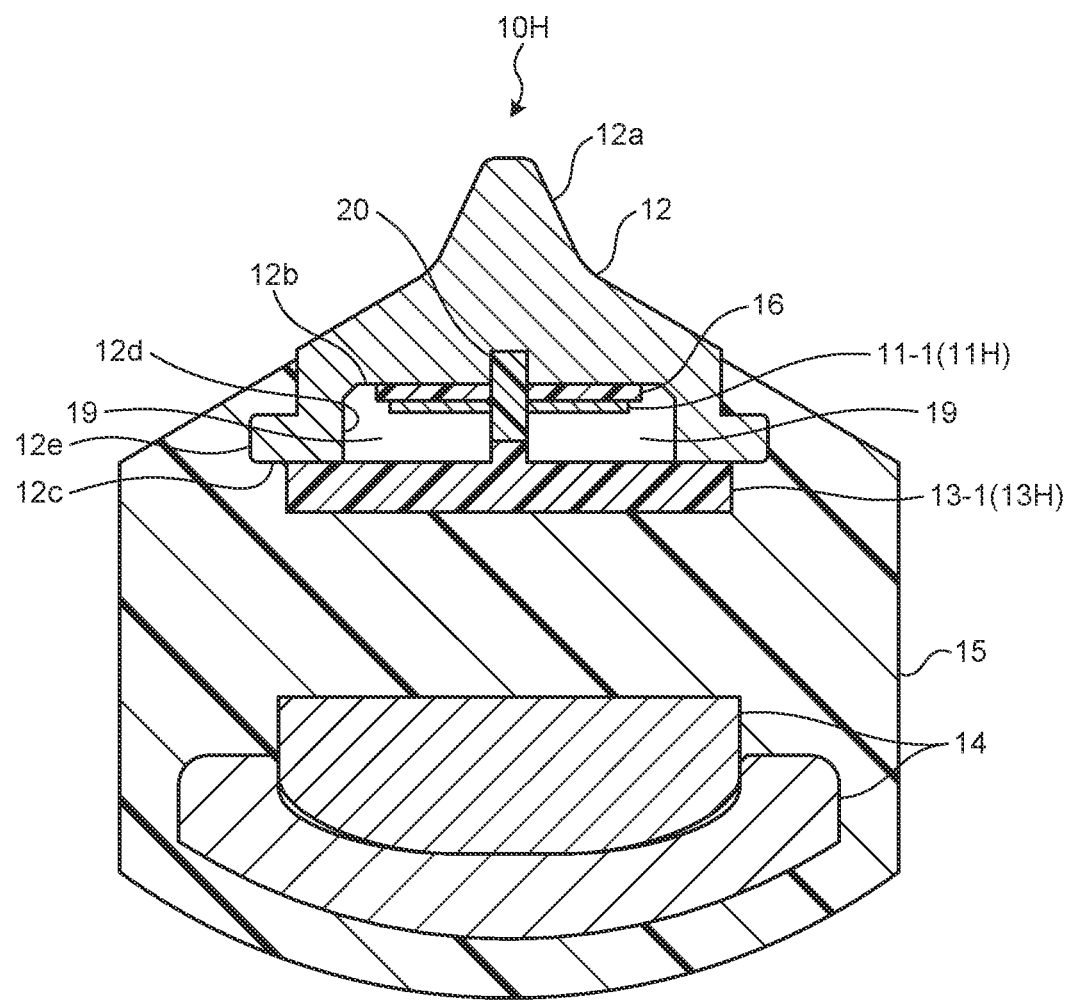
FIG. 16 is a cross-sectional view of a heating blade unit according to an embodiment.

FIG. 16 is a cross-sectional view of a heating blade unit 10H. In the heating blade unit 10H, the air layer 19 is provided between a cover 13H and an electric heater 11H, and the insulating material 20 having thermal conductivity is disposed between the electric heater 11H which is a U-shaped heater. Moreover, in the heating blade unit 10H, the cover 13H covers the support surface 12c and the insulating material 20. The air layer 19 and the insulating material 20 are provided in an area extending in the same direction as the electric heater 11H. In the heating blade unit 10H, by providing the air layer 19 having a low thermal conductivity between the cover 13H and the electric heater 11H, heat transfer to the holder 15 and the frame 14 through the cover 13H can be further reduced, and thermal invasion to a living body by the holder 15 and the like can be prevented. In addition, since heat dissipation due to heat transfer to the frame 14 and the holder 15 can be reduced, the blade 12 can be efficiently maintained at a high temperature. Furthermore, by providing the insulating material 20 having thermal conductivity, a short circuit between heaters can be reliably prevented, and thermal conductivity from the electric heater 11H to the blade 12 can be improved by the insulating material 20 having thermal conductivity.

According to the disclosure, it is possible to achieve a heating blade unit having high temperature resistance and capable of preventing a short circuit of a heater.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A treatment tool comprising:
an electric heater,
a blade including:
a treatment surface configured to perform treatment on a biological tissue,
an installation surface provided on a side opposite to the treatment surface, the electric heater installed on the installation surface, and
a flange protruding outward from a lateral side of the blade in a width direction transverse to the stacking direction of the blade and the electric heater, the flange including a support surface provided at a different position from the installation surface in a stacking direction of the blade and the electric heater, the support surface being opposite to the treatment surface,
a resin cover covering the electric heater, the installation surface, and at least a part of the support surface; and
a holder holding the blade and the resin cover, the holder directly contacting both the resin cover and the blade.

2. The treatment tool according to claim 1, further comprising
a pair of grippers, and
a heating blade unit disposed on at least one of the pair of grippers, the heating blade unit including the electric heater, the blade, the resin cover, and the holder.

3. The treatment tool according to claim 1, further comprising a water-resistant sealing structure for performing treatment in a liquid.

4. The treatment tool according to claim 1, wherein the holder includes a frame disposed in the holder.

5. The treatment tool according to claim 1, wherein the blade includes a roughened surface formed by a surface roughening treatment, the roughened surface being in contact with the resin cover and being covered with the resin cover.

6. The treatment tool according to claim 5, wherein the treatment surface of the blade has a surface treatment for preventing sticking of the biological tissue.

7. The treatment tool according to claim 1, further comprising
a high frequency electric wire that is provided with an insulating outer coating, the high frequency electric wire being configured to supply a high frequency current to the blade, wherein the blade has electrical conductivity.

8. The treatment tool according to claim 1, further comprising
an adhesive layer adhered to the installation surface, wherein
the electric heater is fixed to the installation surface via the adhesive layer.

9. The treatment tool according to claim 1, wherein the resin cover is made of a thermosetting resin including a filler for adjusting a thermal expansion coefficient.

10. The treatment tool according to claim 9, wherein a thermal expansion coefficient of the resin cover is equivalent to a thermal expansion coefficient of the blade.

11. The treatment tool according to claim 1, wherein at least a part of the support surface contacts the resin cover.

12. The treatment tool according to claim 1, further comprising:
a power source configured to supply power to the electric heater; and
a housing that holds the power source.

13. A treatment tool comprising:
an electric heater,
a blade including:
a treatment surface configured to perform treatment on a biological tissue,
an installation surface provided on a side opposite to the treatment surface, the electric heater installed on the installation surface, and
a support surface provided at a different position from the installation surface in a stacking direction of the blade and the electric heater,
a resin cover covering the electric heater, the installation surface, and at least a part of the support surface;
a holder holding the blade and the resin cover, the holder directly contacting both the resin cover and the blade; and
two heater electric wires configured to supply power to the electric heater, wherein
the electric heater includes a first heater portion adhered to the blade and a second heater portion extending from a proximal end side of the blade in an extending direction of the blade,
the second heater portion includes connection portions to which the two heater electric wires are connected respectively, and
the resin cover covers the first heater portion and the second heater portion.

14. The treatment tool according to claim 13, wherein each of the two heater electric wires includes an insulating outer coating, and the insulating outer coating includes a portion that has been subjected to a surface treatment for improving adhesion with the resin cover.

15. The treatment tool according to claim 13, wherein a core wire of each of the two heater electric wires is a single-wire electrically conductive wire.

16. The treatment tool according to claim 13, wherein the electric heater includes a resistance pattern in the first heater portion and the second heater portion.

17. The treatment tool according to claim 13, wherein the heater electric wires are disposed within a range of a width of the installation surface in a view from the extending direction of the blade.

18. The treatment tool according to claim 13, further comprising
a high frequency electric wire configured to supply a high frequency current to the blade, wherein
the blade has electrical conductivity, and
the high frequency electric wire is disposed between the two heater electric wires.

19. The treatment tool according to claim 16, wherein the resistance pattern of the electric heater is configured to generate heat to a temperature of 200° C. or higher and 350° C. or lower.

* * * * *